Figure 1:
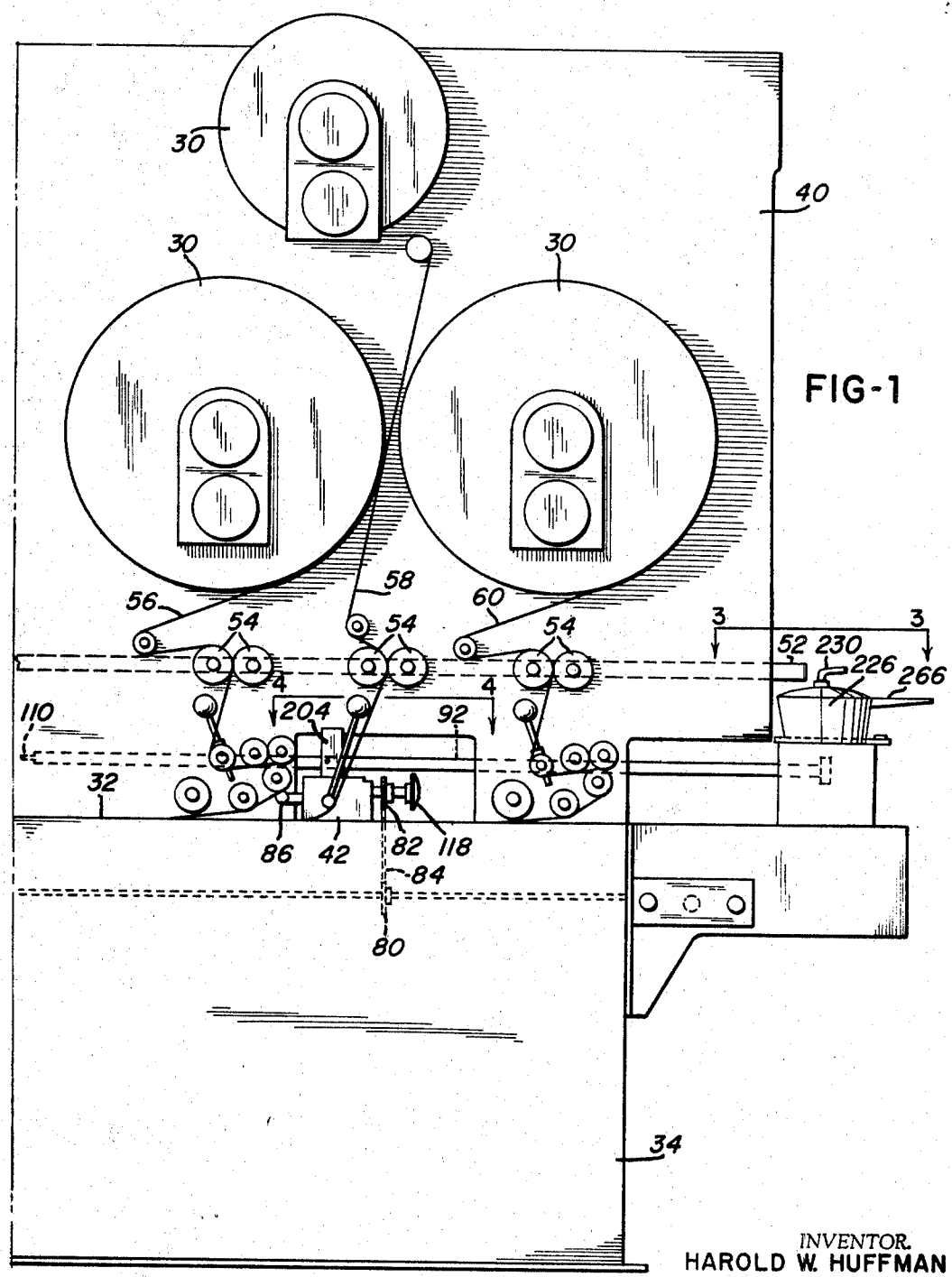

INVENTOR.
HAROLD W. HUFFMAN

Nov. 4, 1969

H. W. HUFFMAN 3,476,631

METHOD OF AND MEANS FOR DISTRIBUTING
GLUE TO A MOVING WEB

Filed Nov. 18, 1963

9 Sheets-Sheet 3

INVENTOR.
HAROLD W. HUFFMAN

BY
*Kinney & Schenk*
ATTORNEYS

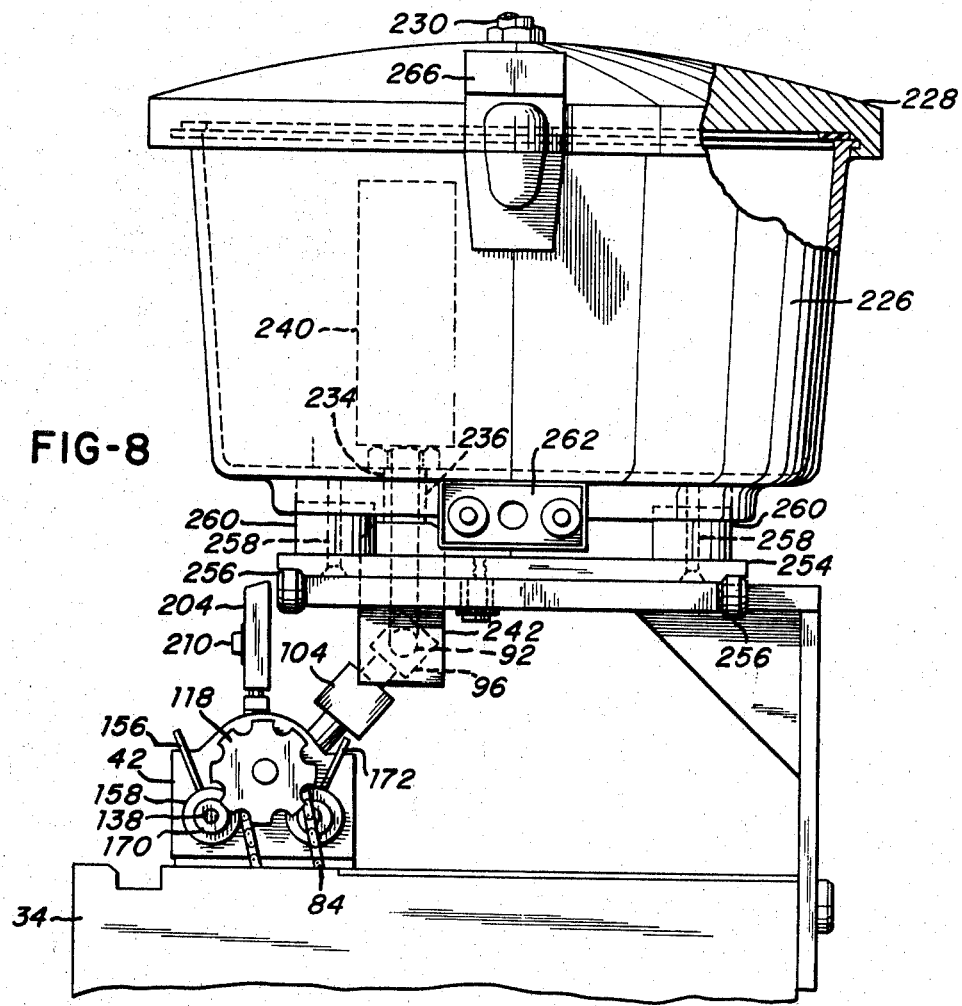

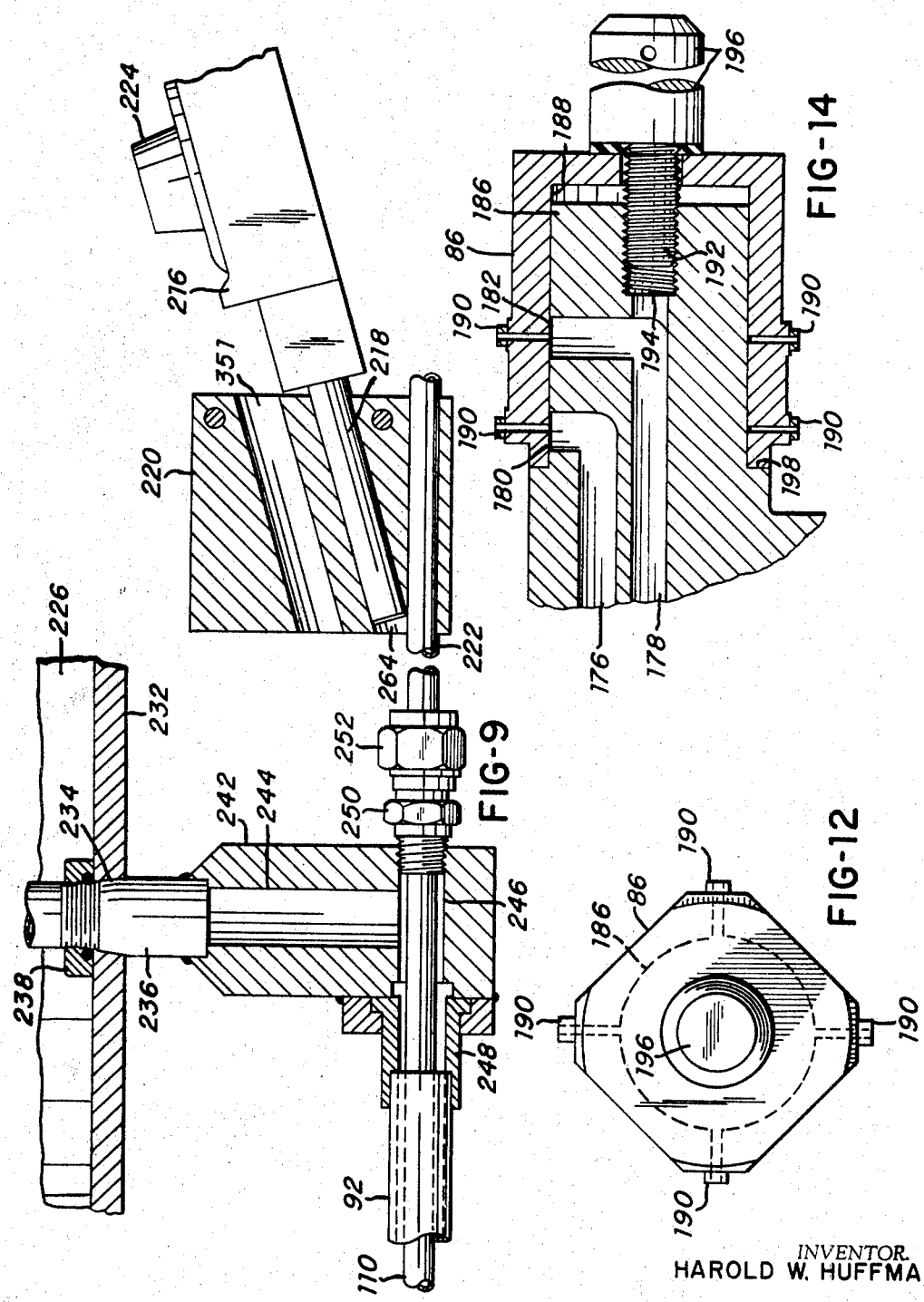

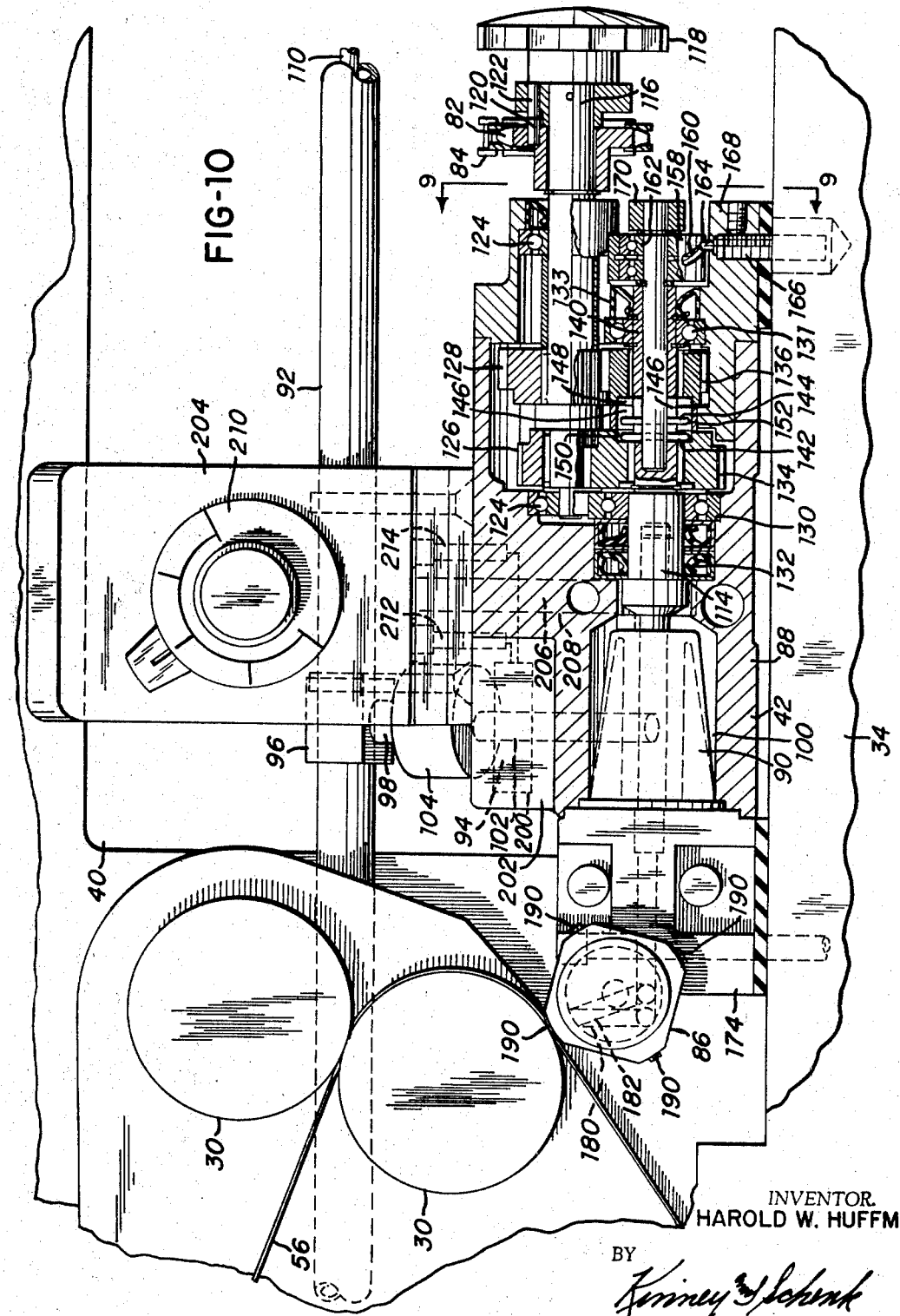

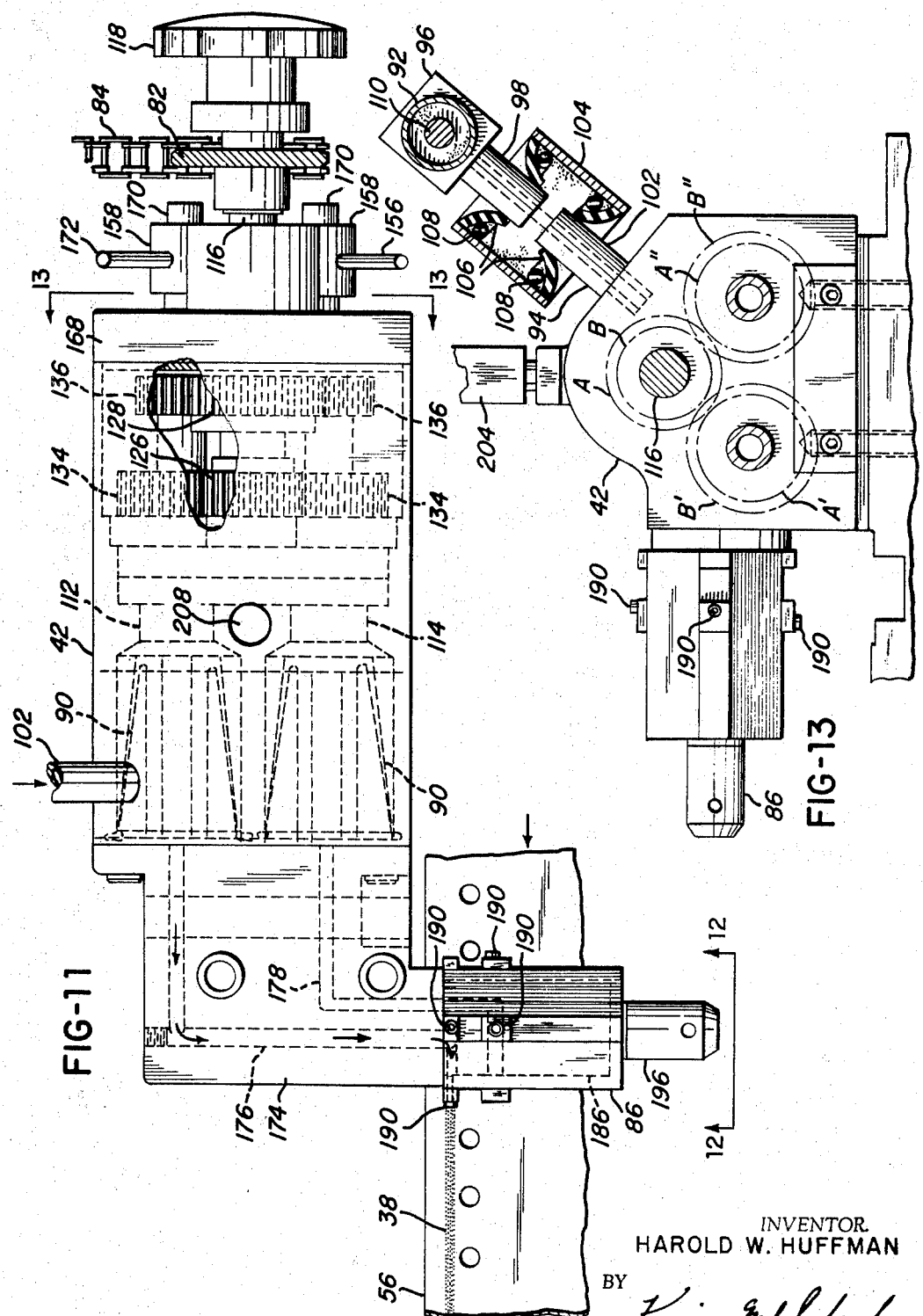

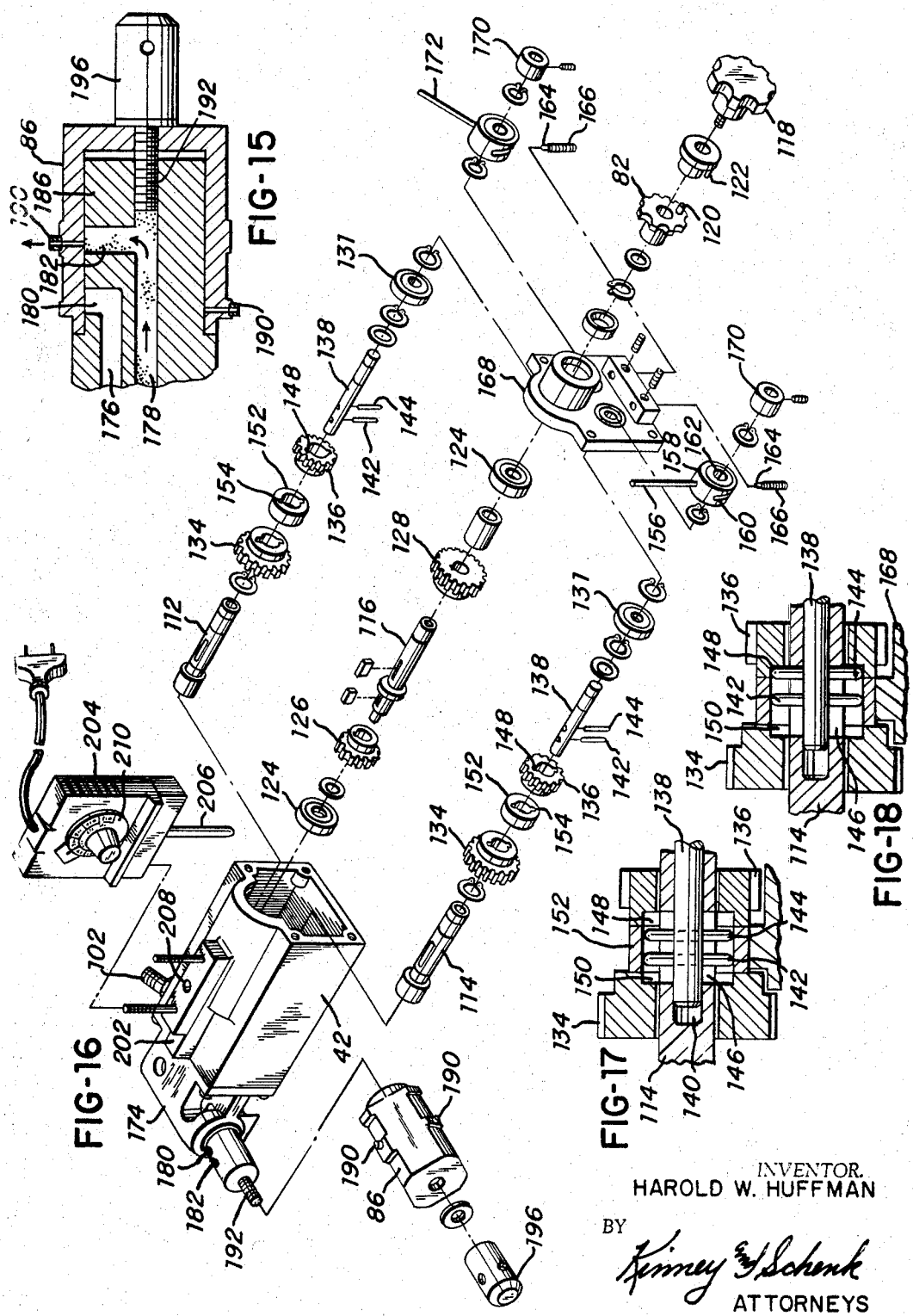

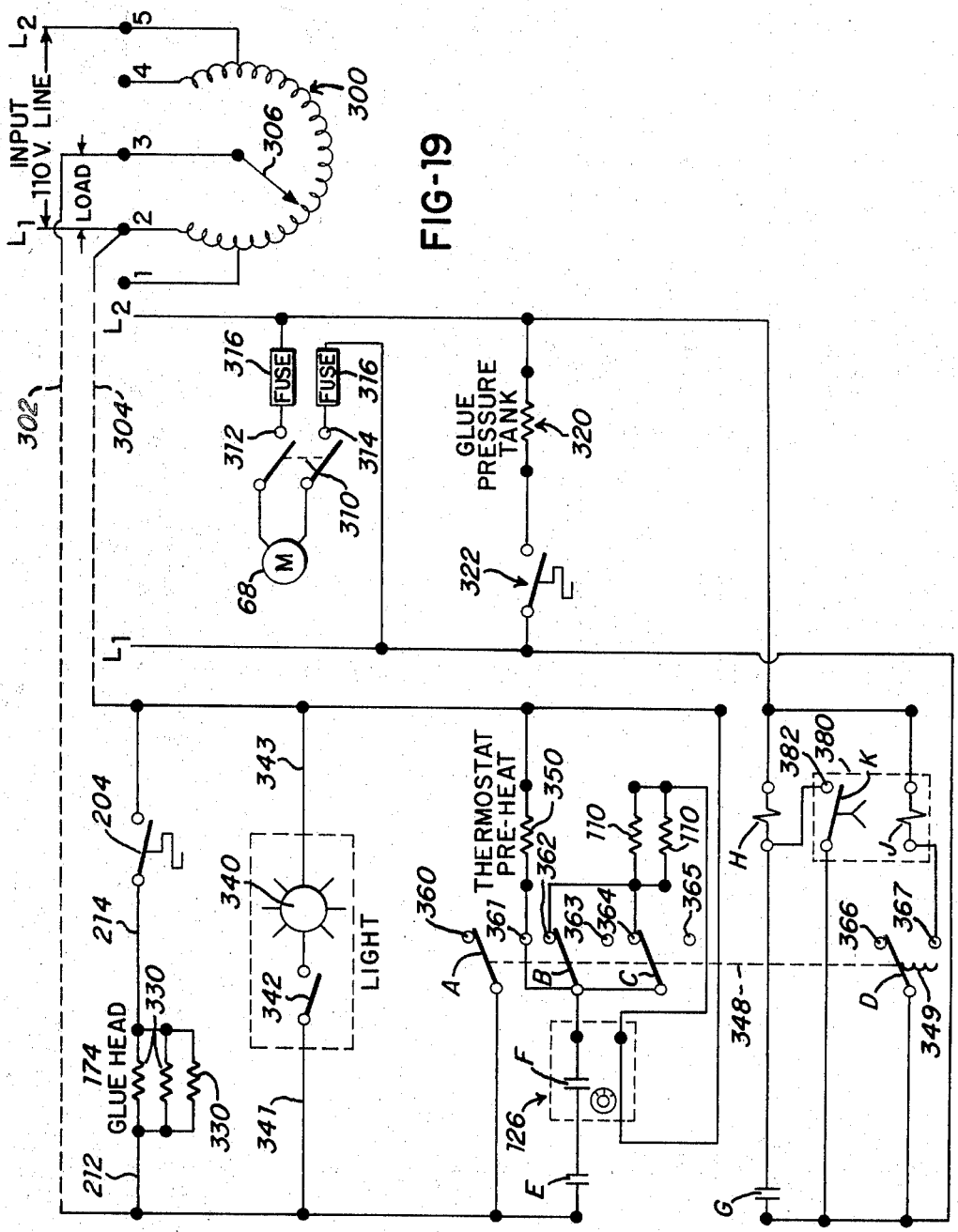

United States Patent Office 3,476,631
Patented Nov. 4, 1969

3,476,631
METHOD OF AND MEANS FOR DISTRIBUTING GLUE TO A MOVING WEB
Harold W. Huffman, Hamilton, Ohio, assignor to The Hamilton Tool Company, Hamilton, Ohio, a corporation of Ohio
Filed Nov. 18, 1963, Ser. No. 324,419
Int. Cl. B32b 7/12, 31/04
U.S. Cl. 156—291                        30 Claims This invention relates to a glue-distributor system, and more particularly to means for applying hot-melt glue to webs for use in collating operations, and the like.

An object of the invention is to provide simple yet highly effective and substantially fool-proof means for applying a predetermined amount of heat to hot-melt glue whereby to render said glue sufficiently fluid for its intended use; and for maintaining said heat-melted glue in liquid condition for enabling it to be efficiently conducted from a glue pot to applicator nozzles located remote and at substantial distances from the glue pot.

A further object of the invention is to provide unique nozzle means each of which includes a pump adapted to receive liquid glue from a common conduit, and to apply a positive pressure to said glue for forcing glue into and through a discharge nozzle in conjunction with said pump.

Still a further object of the invention is to provide a device having the hereinabove described characteristics which is flexible whereby to enable various types of applicator nozzles to be quickly associated with and/or removed from the various applicator heads.

Another object of the invention is to provide means for maintaining the hot-melt glue at a predetermined temperature for maintaining it at a given viscosity.

Another object is to provide in a glue-applying mechanism, improved means for achieving a high degree of control over hot-melt glue, resulting in the production of uniformly high quality glued products and great efficiency in the manufacture thereof.

Another object is to provide improved glue handling mechanism so constructed as to effectively control and apply glues of many types, some of which are much less expensive than others in initial form, and others of which have a desirably large safety temperature range between the melting and the burning stages of the glue.

Another object is to provide an improved glue-applying mechanism capable of effectively controlling and applying hot glue to a web in a very thin state, assuring prompt and thorough wetting of the web fibers with glue in such manner as to decrease the setting time and effect a superior bonding action.

Another object is to provide an improved glue-applying mechanism which is highly reliable in operation and subject to minimum shut-down on account of nozzle clogging and lack of control of the glue.

Figure 2:
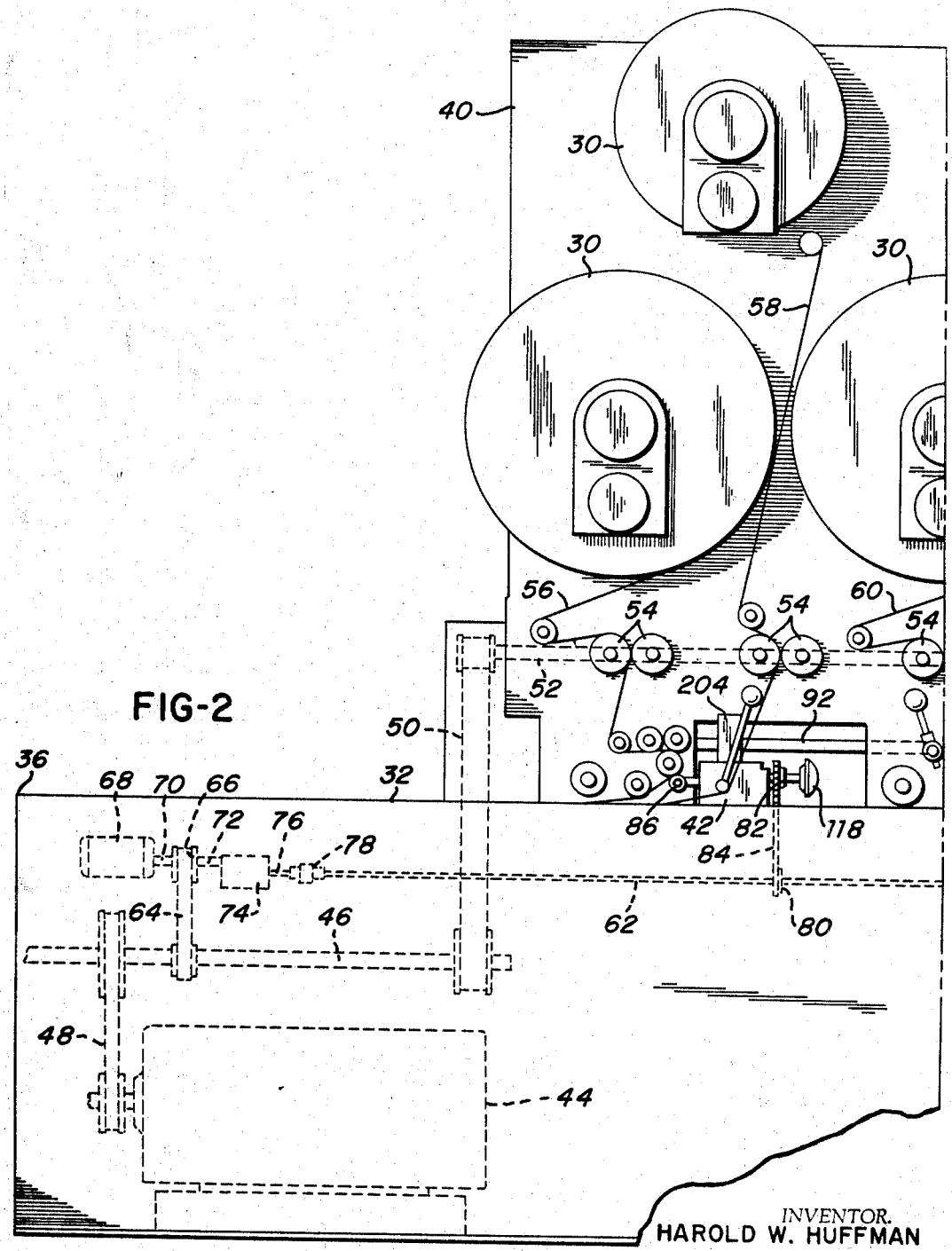

These and other objects are attained by the means described herein and as disclosed in the accompanying drawings in which:

FIGS. 1 and 2 represent side views of opposite ends of a typical collator provided with the glue distributing system of the present invention.

Figure 3:
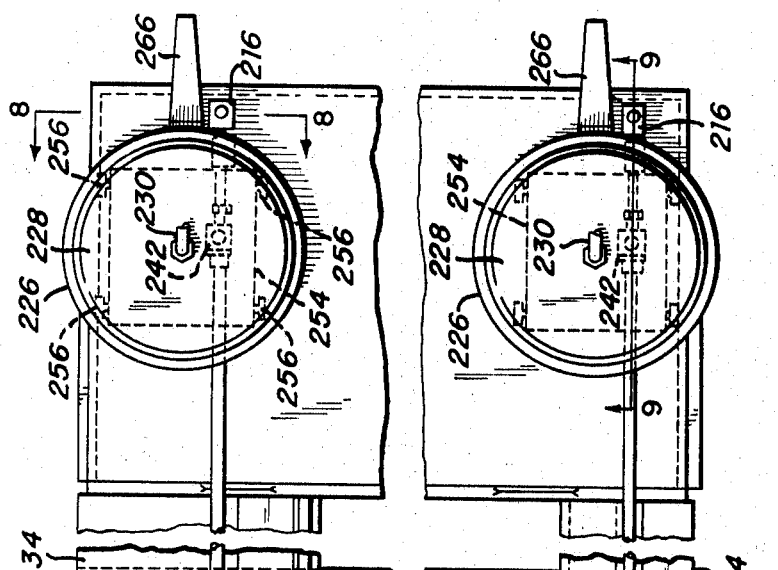
Figure 4:
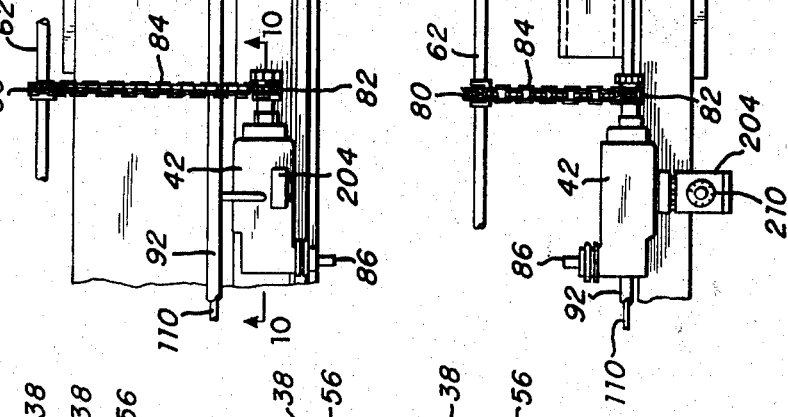
Figure 5:
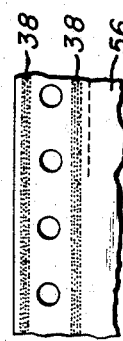
Figure 6:
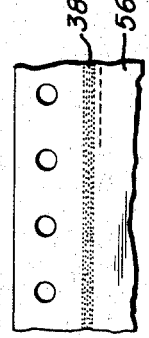
Figure 7:
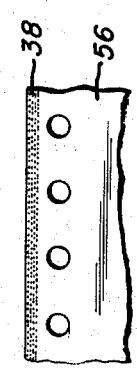

FIG. 3 is a top plan view taken on line 3—3 of FIG. 1.
FIG. 4 is a top plan view taken on line 4—4 of FIG. 1.
FIGS. 5, 6 and 7 are plan views of typical glue-patterns which the subject device is capable of applying to a web.
FIG. 8 is an enlarged elevational view taken on line 8—8 of FIG. 3.
FIG. 9 is an enlarged cross-sectional view taken on line 9—9 of FIG. 3.
FIG. 10 is an enlarged cross-sectional view taken on line 10—10 of FIG. 4.
FIG. 11 is a plan view of the pump and glue dispenser nozzle of FIG. 10.

FIG. 12 is a plan view taken on line 12—12 of FIG. 11.
FIG. 13 is a cross-sectional view taken on line 13—13 of FIG. 11.
FIG. 14 is an enlarged sectional view of a nozzle comprising a detail of the present invention.
FIG. 15 is a view similar to FIG. 14 showing a modified type of discharge nozzle.
FIG. 16 is an exploded view illustrating the pump, gear drive and discharge nozzle assembly comprising a detail of the invention.
FIG. 17 is a partial view, in vertical section illustrating the pump-driving means in a neutral position.
FIG. 18 is a view similar to FIG. 17 showing the relationship of parts for placing the drive in high speed driving position.
FIG. 19 is a schematic wiring diagram of the electrical control circuits which comprise a detail of the present invention.

The drawings illustrate a collator for webs of paper or other strip material payed from rolls or reels 30 which may be arranged in groups above the horizontal table 32 of the bed 34. The table supports the webs for movement toward the delivery end 36 (FIG. 2) of the bed, after the webs have been superposed one upon another and glued together by means of glue stripes 38 applied in accordance with FIG. 5, 6 or 7. Any desired number of rolls or reels 30 in groups, may be supported above the table along the length of the collating machine, supports therefor being indicated at 40.

Preferably though not necessarily, a separate support 40 is provided for each group of rolls 30. In referring to FIGS. 1 and 2, it should be understood that these views show one group of rolls 30 at the head end of the machine (FIG. 1), whereas FIG. 2 shows a different group of rolls 30 at the delivery end of the machine. There may be other similar groups of rolls intermediate those shown at the opposite ends of the machine, and in fact it is usual for such machines to embody a substantial number of intermediate groups of rolls all feeding webs onto the same table 32.

Each group of rolls has associated therewith a glue applicator adapted to adhesively connect the webs payed from the rolls of a group. Glue applicators 42 are shown beneath the rolls 30 in each of FIGS. 1 and 2.

Referring to FIG. 2, the delivery end of the machine may support a main drive motor 44 transmitting rotation to the main shaft 46 of the machine by means of a belt or chain drive 48. By means of a second belt or chain drive 50, the main shaft rotates a feed roll drive shaft 52 which is geared to the feed rolls 54, the latter serving to continuously withdraw webs 56, 58, 60 from the several reels or rolls 30, and advance said webs toward the glue applicators and table 32. As was previously explained, the several webs are superposed upon one another as they advance along table 32 toward the delivery end 36.

At 62 is indicated a pump drive shaft, which extends the length of the machine bed and serves to drive all the pumps of the glue applicators 42, as will be explained. The pump drive shaft normally is rotated by means of a belt or chain drive 64 from main shaft 46, through an overrunning clutch 66. The arrangement here is such that an auxiliary electric motor 68 can be used to rotate the pump drive shaft 62 when the main drive motor 44 is at rest, thereby making possible a conditioning of the glueing apparatus in advance of feeding any web material past the glue applicators. This of course avoids waste of web material and the production of rejectable compilation due to a lack of glue at the applicators.

The shaft 70 of auxiliary motor 68 may be caused to drive the clutch 66 as above stated, the output shaft 72 of the clutch serving to drive a speed reducer 74 whose output shaft 76 in turn rotates the pump drive shaft 62 through the intermediary of a shaft coupler 78. The pump drive shaft carries a series of fixed sprockets 80, equal in number to the number of applicators 42, for driving the sprockets 82 of the applicator pumps by means of endless chains 84. Shaft 62 normally is rotated by means of main drive motor 44, but may alternatively be rotated by means of auxiliary motor 68 when the main drive motor is at rest, due to the overrunning character of clutch 66.

Applicators 42 may be secured to the machine bed in a line which is parallel to pump drive shaft 62, and each includes a laterally extending nozzle head 86 over which may pass a margin of a web such as 56 for receiving glue from the nozzle head. If the web is to receive glue along two margins, two parallel lines of applicators will be provided as indicated by FIG. 4, so that the web may travel between opposed applicators with opposite margins of the web riding over both nozzle heads 86.

Each applicator 42 includes a pump for liquid glue, arranged in close proximity to the nozzle head so as to avoid or reduce surge and overrun of glue at the nozzle head upon starting and stopping the pump. Gearing associated with the pump provides for different pump speeds and for de-activating the pump completely at the will of the operator. Each pump is thusly individually controllable, notwithstanding continuity of rotation of the pump drive shaft 62.

The applicator and pump are best illustrated by FIGS. 10 to 13 and 16 to 18. A hollow casing 88 rotatably supports therein a pair of impellers 90—90 adapted to draw liquid glue from a supply pipe 92 by way of a branch pipe 94, and direct the glue to the nozzle head 86. The branch pipe connection to the supply pipe may comprise (FIG. 13) a hollow connector block 96 secured about supply pipe 92 and carrying a hollow nipple 98 to convey glue from the supply pipe. The nipple is directed toward the impeller chamber 100 and aligns approximately with a nipple 102 on casing 88 in communication with said chamber. A coupling member 104 spans the nipples to provide a flexible connection, and may consist of a short rigid tube enclosing a pair of resilient discs 106 perforated centrally to accommodate and conform to the nipples 98 and 102, for effecting a seal therewith.

As liquid glue under pressure fills the coupling member between discs 106, the resultant flexation of the discs intensifies the seals about the nipples 98 and 102 to preclude leakage at the connection. The numerals 108 indicate rigid ring inserts located within the coupling member and in contact with discs 106, to augment the sealing function of the discs. It should be readily understood that the coupling member disclosed is flexible to permit limited lateral shifting of nipple 98 relative to nipple 102 resulting from elongation and contraction of glue supply pipe 92 under varying temperature conditions. The glue supply pipe includes an electric heater rod 110 running lengthwise thereof, as will be explained in detail hereinafter.

With further reference to glue applicator 42, the impeller shafts 112 and 114 thereof are selectively driveable by an applicator main shaft 116 having gearing and clutch means associated therewith, whereby an attendant may clutch either or both impellers 90 in driven relationship with main shaft 116, with a choice of low or high speed impeller rotation individually so that one impeller may operate at high speed while the other operates at low speed; or if desired, one impeller may be driven while the other remains inactive, or under certain conditions both impellers may be de-clutched while main shaft 116 continues to be driven by sprocket 82 and chain 84.

Shaft 116 carries a fixed handwheel 118 whereby said shaft may be rotated manually in either of two directions. Sprocket 82 is rotatable upon shaft 116, but carries a drive pin 120 which extends laterally therefrom to engage a similar pin 122 fixed upon the handwheel. Accordingly, when sprocket 82 is rotated by means of chain 84, sprocket pin 120 will strike pin 122 and carry the latter around with it to rotate shaft 116. The pin drive referred to allows an attendant to manually rotate the handwheel and shaft 116 independently of sprocket 82, through nearly 360 degrees, in order to facilitate shifting of gears in the impeller drive train.

Shaft 116 is supported in bearings 124, and carries two gears 126 and 128 keyed thereto. The bearings preclude longitudinal shifting of the shaft. Clutch and gear assemblies on impeller shafts 114 and 116 are identical to one another, so that a description of one should suffice for the other also. Accordingly, impeller shaft 114 has fixed thereto an impeller 90, and is supported for rotation in bearings 130 and 131 against which are imposed the shaft seals 132 and 133. Freely rotatable upon shaft 114 is a low speed gear 134 in constant mesh with gear 126. A high speed gear 136 on shaft 114 is freely rotatable thereon, and is in constant mesh with gear 128. Gears 134 and 136 being rotatable upon shaft 114, cannot drive said shaft in the absence of means effecting a connection between the shaft and one or the other of said gears.

Manual means is provided for drivingly connecting shaft 114 to one or the other of gears 134 and 136. Such means may comprise a shift rod 138 longitudinally slidable in an axial bore 140 of shaft 114, and carrying clutch means which may consist of a pair of transverse pins 142 and 144 slidable within a transverse slot 146 of said shaft 114. Rod 138 may be shifted lengthwise to dispose the pins in any of three positions as depicted by FIGS. 10, 17 and 18. In FIG. 17, pins 142 and 144 occupy a space between gears 134 and 136 permitting said gears to rotate freely upon shaft 114 without rotating the shaft and its associated impeller 90. The pump therefore will be inactive notwithstanding continued rotation of applicator main shaft 116.

If as in FIG. 18 the shift rod 138 is manually displaced toward the right, pin 144 will enter a radial notch 148 in a face of gear 136, causing this continuously rotating gear to drive the rod 138, shaft 114, and its associated impeller 90 at high speed.

On the other hand, if shift rod 138 is manually displaced to the left limit, its pin 142 will enter a radial notch 150 in a face of low speed gear 134, causing this continuously rotating gear to drive the rod and shaft 114, and the impeller, at low speed. Thus, the impeller may be rendered active to pump fluid glue to a nozzle head at a greater or lesser rate, as may be required. When the gearing is neutralized as in FIG. 17, no glue will be advanced to the nozzle head due to a static condition of the impeller.

The numeral 152 indicates a spacer for gears 134 and 136, and may include a radial notch 154 in which the pins 142 and 144 may travel when shifted from the neutral position to either of the clutching positions with gears 134 and 136. The spacer rotates with shift rod 138 and shaft 114 when the clutch means is engaged, thereby placing both pins in driving relationship with impeller shaft 114 in either of the driving positions of a pin.

When it is considered that both impeller shafts 114 and 116 are equipped with components as above described, it is evident that both impellers 90 may be individually controlled by a manual shift rod such as 138, to advance glue to a nozzle head either rapidly or at a reduced rate of flow. Moreover, one or both impellers may be rendered inactive by manipulation of the shift rods.

For longitudinally moving shift rod 138 from the neutral position of FIG. 17 to either of the clutching positions of FIGS. 18 and 10, there is provided means including a suitable hand lever 156 exposed exteriorly of the applicator casing. Lever 156 is fixed upon a cam barrel 158 having an oblique or spiral cam slot 160 in its outer face. The barrel is mounted upon shift rod 138 for rotation, so that the rod might rotate with a gear 134 or 136 without rotating the barrel. The mounting of cam barrel 158 upon rod 138 is such that the barrel and the rod shift longitudinally in unison.

As illustrated, the cam barrel 158 surrounds and is fixed to the outer race of a ball bearing whose inner race 162 is fixed to shift rod 138. Thus, the rod may rotate within the barrel, and longitudinal shifting of the barrel induces corresponding longitudinal shifting of the rod.

An upstanding cam follower 164 carried by one end of a screw 166 which is anchored in an end cap 168 of casing 88, projects into the cam slot 160 of barrel 158. Upon limited manual rotation of barrel 158 by means of hand lever 156, follower 164 coacts with spiral slot 160 to bodily shift the barrel, along with rod 138, a distance sufficient to traverse the clutch pins 142 and 144 from clutching engagement with gear 134, to clutching engagement with gear 136. The follower when disposed at the middle portion of slot 160, places the clutch pins in the neutral or non-driving position of FIG. 18. The outer end of shift rod 138 may be supplied with a collar 170.

As was previously stated herein, the components associated with impeller shaft 114 are duplicated upon the second impeller shaft 116, this being evident by referring to FIG. 17. The hand lever 172 corresponds to hand lever 156, and such levers are individually and independently operable for controlling the action of the two impellers 90.

At the impeller end of casing 88 is fixed a distributor block 174 having bores or passageways 176 and 178 which convey fluid glue to the nozzle head. Bore 176 is in communication with one impeller 90, whereas bore 178 is in communication with the remaining impeller. At their outer ends the bores terminate as openings or ports 180 and 182 (FIG. 14), in a laterally extending cylindrical mandrel 186 which is integral with block 174. The mandrel supports the nozzle head 86, which has a bore 188 receptive of the mandrel.

Nozzle head 86 snugly receives mandrel 186 and has formed thereon a plurality of radially disposed nozzles 190 which, by rotational adjustment of the head upon the mandrel, may be placed in selective registry with the ports 180 and 182. The nozzles may have differing characteristics for projecting onto a web one or more glue stripes 38 variously characterized or located thereon. Some typical glue stripe patterns are indicated upon FIGS. 5, 6, 7 and 11.

In FIG. 15, a single nozzle 190 is shown in registry with one port 182, while the other port 180 remains closed due to the absence of a nozzle adjacent to the single nozzle aforesaid. This arrangement would apply to the web a single glue stripe such as FIG. 6 illustrates. If the head of FIG. 15 were rotated a half-turn upon the mandrel, the two nozzles shown at the bottom of FIG. 14 would assume positions in registry with each of the ports 180 and 182, to apply glue stripes in parallelism according to FIG. 5.

Rotational adjustment of nozzle head 86 may be accomplished by loosening the clamp screw 192 which threads into an axial internally threaded bore 194 of the mandrel. The clamp screw has a head 196 whereby the screw may be rotated to normally clamp the nozzle head against a shoulder 198 of the mandrel.

Some of the nozzles of nozzle head 86 may be differently spaced from shoulder 198, within the limits of ports 180 and 182, to apply glue stripes at various distances from the web margins, as may be required.

One of the important features of the invention concerns maintaining a heated condition of the glue throughout the glue feeding system of the machine, and in furtherance of this feature the glue applicator is provided with an electric heating element 200 incorporated or embedded in a chambered boss 202 of casing 88. The heating element preferably is located near glue supply nipple 102 and impeller chamber 100, and may be controlled by a thermal unit 204 of ordinary type which includes an electric switch and a heat-responsive probe 206. The probe extends into a bore 208 provided in casing 88, and functions to alternately open and close the heating element circuit for maintaining a desired temperature of the casing most favorable to flow of glue from supply pipe 92, past the impellers 90, and into the nozzle head 86.

The thermal unit 204 may include an adjusting knob 210 for regulating the thermostatic control and consequently the amount of heat emitted by element 200. The numerals 212 and 214 indicate contact prongs on unit 204 for conducting electric current through the unit and the heating element, in usual manner.

If desired, the distributor block 174 containing the glue passageways and ports 180 and 182, may be heated by means of a separate heating element (not shown), connected in the circuit controlled by thermal unit 204.

As was previously mentioned herein, the supply pipe 92 delivering glue to the several applicators 42 is to be heated, as by means of an electric heating element 110 extending lengthwise through the supply pipe. The temperature of element 110 may be controlled and maintained at a given level by means of a thermostatic heat control unit 216, the probe 218 of which may be buried in a convector block 220 surrounding a section 222 of the heating element. Unit 216 may be regulated by means of an adjusting knob 224, to establish a desired average temperature of the heating element.

A reservoir for glue is indicated at 226, and is preferably in the form of a melting pot constructed in the manner of a pressure cooker of the household type. The pot has a sealing lid or cover 228 with a central vent 230 which may be connected to a source of air or other gas under pressure, for maintaining a constant head of pressure within the glue supply system.

The pot bottom 232 may be apertured at 234 to accommodate a pipe section 236 secured and sealed by nut 238, and having an upper portion supporting a filter element 240 disposed within the pot. The filter element so located removes all foreign matter from the glue before it can enter the glue supply system, this being extremely important from the standpoint of precluding clogging of the nozzle orifices.

The lower end of pipe section 236 carries a hollow L-shaped fitting 242 having a bore 244 in fluid communication with the interior of filter element 240, said bore being intersected by a transverse bore 246 accommodating heating element 110. At 248 is shown a nipple in alignment with bore 246 for rigidly supporting an end of glue supply pipe 92. The heating element 110 extends through nipple 248 and bore 246, and emerges from fitting 242 through suitable fluid-tight gland fittings 250 and 252 surrounding the heating element.

Referring to FIGS. 8 and 3, it is noted that melting pot 226 is shiftably supported upon the machine bed, as by means of a carriage 254 which rides upon rollers 256, so that the pot may accommodate itself to longitudinal expansion and contraction of heated glue supply pipe 92 under varying temperature conditions. Rollers 256 may be rotatably supported upon the machine bed, with carriage 254 resting upon the rollers. Screws 258 anchored in the pot bottom and passing through the carriage and suitable spacers 260, may serve to fix the melting pot upon the carriage.

The numeral 262, FIG. 8, indicates an electric socket to receive a plug for conducting electric current to the heating element of the glue supply pipe. Such current is controlled by the adjustable thermostatic switch unit 216, FIG. 9. The switch unit probe 218 may be accommodated within bore 264 provided in convector block 220.

A handle 266 on the glue pot lid or cover 228, may facilitate removal and application of the lid or cover when recharging of the melting pot with glue is necessary. It may here be noted that a glue pot provided as above explained, keeps the heated fluid glue under pressure for reliable delivery to the several heated applicators, the glue being first filtered to remove foreign particles or blobs capable of clogging the nozzles. In addition, the type of glue system disclosed makes possible the use of solid-state commercial glues in various forms, such as granules, pellets, shavings, logs or bricks, some of which are much less expensive and more easily obtainable than glues in rope form as generally employed in the art.

As a further advantage, the presently disclosed glue system permits the use of melted glue in a relatively thin state, which readily wets the paper fibers and sets up quickly after application, thereby enhancing and expediting the collating and assembly of sheets by the machine.

With reference now to FIG. 19, the indicia L1 and L2 indicate a conventional source of electrical power which, in the preferred embodiment of the invention is connected to taps 2 and 5 of a variable voltage transformer denoted generally by the numeral 300. The function of the variable voltage transformer is to provide a constant, pre-selected voltage to conductors 302 and 304, according to the setting of selector arm 306.

It will be noted that motor 68, FIG. 2, may be manually connected across power supply lines L1 and L2 by means of a double pole, single throw, switch 310 via contacts 312, 314 and their respective fuses 316.

The numeral 320 denotes a conventional electric heating element such as, by way of example, is incorporated into the base of a standard, commercially available, pressure-cooker viz, the glue pressure tank or melt pot 226. The numeral 322, of FIG. 19, denotes a conventional thermostatic heating control unit in series circuit with heating element 320 of the melt pot for establishing and maintaining it and its contents at a preselected temperature.

In FIG. 19, I have illustrated, for simplicity and ease of understanding, but one of a plurality of the thermostatic heat control units 204 and its associated heating elements 330 which are associated with the various distributor blocks 174. The numerals 212 and 214 of FIG. 19 correspond with all said numerals they appear in FIG. 10.

If desired, and solely by way of convenience, a source of light 340 may be provided adjacent each of the distributor blocks 174 for providing adequate and selective illumination to enable an operator in making various adjustments and/or inspections of the various distributor glue elements. A single throw, single pole switch 342 may be provided in series circuit with conductors 302 and 304 via 341 and 343.

With reference further to FIG. 19, the numeral 350 denotes a heater element which is in the form of a plug receivable within opening 351 of connector block 220 (FIG. 9), said heating element adapted to pre-heat block 220 incident to the starting up, or initial heating of the glue system, as follows:

A four pole, two position, manually operatable switch is normally maintained in the position illustrated by means of a spring 349. Said switch, as illustrated includes contact arms A, B, C, and D which normally engage contacts 360, 362, 364, and 366, respectively, whereas the letters E, F, and G denote normally open contacts which are moved to closed position incident to enerization of coil H.

From the foregoing, it will be noted that when switch 348 is open, heater coils 350, 370, and 372 and coils H and J will be deenergized.

The manifold or connector block 220 is initially preheated by operator manually actuating the four pole switch 348 to a lowered or "on position" for disposing arms A, B, C, and D in contacting relationship with contacts 361, 363, 365, and 367 respectively. Heater 350 will thereupon be energized for pre-heating block 220 (see FIG. 9), and probe 218 of the thermostatic heating control unit 216, so that the heat-soak time from the manifold Calrod 110 (heater coils 370 and 372) is not late at the thermostat control, thereby preventing overshooting of the temperature in the glue manifold 92.

The aforesaid actuation of switch 348 energizes coil J of a timer, denoted generally by the numeral 380. After a predetermined period of time has expired, in this example three (3) minutes, contact arm K of the timer will be actuated to engage contact 382 and thereby close an electrical circuit through coil H of a relay, which thereby actuates, closes, and maintains in closed condition the normally opened contacts at G, E, and F, thereby completing a circuit through the thermostat 216.

After three (3) minutes, when switch 348 is released, the normally closed contact arms B and C will maintain heating elements 350, 370, and 372 in series circuit with thermostat 126 whereby said thermostat as long as voltage is applied to the unit. Upon release of switch 348, the circuit to the time relay 380 will be broken incident to movement of an arm K will be advanced away from contact 382.

It should be understood that the thermostatic heat control units, 204, at each of the distributor blocks 174 provide simple, dependable means for automatically maintaining the temperature of the heat-liquefiable glue at an optimum temperature for effecting the application of glue to a web while in a very thin state, whereby the glue will not only promptly and thoroughly wet the web, but it will set rapidly to produce a superior binding action.

In the preferred embodiment of the invention suitable means, not illustrated, may be associated with the pump drive shaft 62 whereby it will be automatically and momentarily reversed in the event that and whenever main drive motor 44 stops. By thus momentarily reversing the direction of rotation of drive shaft 62 a reversing action will be automatically imparted to each of the various pump means at the various glue nozzles. By thus reversing the normal pumping action of the glue metering means whenever the collator itself is stopped, the normal action of the glue metering means will be momentarily reversed for reversing the flow of glue through the various nozzles 190. In this manner I have effectively and automatically prevented the accidental or unintentional discharge of glue from a nozzle 190 onto a web during those periods of time when the collator is not operating.

Heretofore, the accidental or unintentional discharge of the glue from gluing nozzles during those periods of time when a collator was stationary resulted in an abnormal amount of glue being discharged onto the webs thereby creating troublesome problems when the collator was again started up.

From the foregoing it will be noted that I have thus provided simple, yet highly effective means for providing heat-liquefiable glue in a liquid state to each of a plurality of applicator nozzles located at different stations remote from a common glue melt-pot and wherein the temperature of the glue is always accurately controlled and maintained at desired temperatures by reason of the various thermostatic controls.

What is claimed is:

1. The method of providing heat-liquefiable glue in a liquid state to a plurality of applicator nozzles located at different stations remote from a common glue melt-pot, which comprises the steps of:
 (a) liquefying glue in a sealed and pressurized melt-pot by the application of heat thereto,
 (b) conducting under pressure heat liquefied glue from said melt-pot through heated conduits to said applicator nozzles, and
 (c) metering at will the heat liquefied glue from said conduits to said discharge nozzles at predetermined, but variable rates of flow.

2. The method of applying heat liquefiable glue in a liquid state to an applicator nozzle located remote from a glue melt-pot, which comprises the steps of initially heating the glue in a sealed and internally pressurized melt-pot to render it liquid in the melt-pot, conducting under pressure the liquid glue through a heated conduit to an applicator head having an applicator nozzle associated therewith, and of metering liquid glue from the applicator head to the applicator nozzle at a continuous predetermined, but manually adjustable rate of flow.

3. The method of providing heat liquefiable glue in a liquid state to an applicator nozzle located remote from a melt-pot which comprises the steps of:
  (a) providing a quantity of heat-liquefiable glue in a melt-pot,
  (b) applying heat to the melt-pot to liquefy the glue contained therein,
  (c) introducing the heat-liquefied glue under pressure from the melt-pot to an elongate glue distribution conduit,
  (d) applying heat interiorly and axially of said conduit for maintaining the glue therein in liquefied condition,
  (e) feeding liquid glue from said conduit to an applicator head which includes an applicator nozzle,
  (f) heating said head for maintaining the glue therein in liquefied condition,
  (g) metering liquefied glue from the applicator head to a nozzle thereof at a predetermined, but variable, rate of flow for discharge therefrom in a liquid state.

4. The method of providing heat liquefiable glue in a liquid state to each of a plurality of applicator nozzles located at different stations remote from a common melt pot, which comprises the steps of:
  (a) providing a quantity of heat liquefiable glue in a melt pot,
  (b) applying heat to the melt pot to liquefy the glue contained therein,
  (c) subjecting the liquid glue within the melt pot to a pressure head in excess of atmospheric pressure,
  (d) introducing the heat liquefied glue from the melt pot to an elongate glue distribution conduit,
  (e) applying heat interiorly and axially of said conduit for maintaining the glue therein in liquefied condition,
  (f) feeding liquid glue from said conduit to each of a plurality of applicator heads each of which include at least one applicator nozzle,
  (g) heating said applicator heads for maintaining the glue therein in liquefied condition, and
  (h) selectively metering liquid glue from one or more of said applicator heads to an associated applicator nozzle at a predetermined, but variable, rate of flow.

5. Apparatus for applying a stripe of hot-melt fluid glue to a moving web, comprising in combination, an elongate machine bed having a head end and a discharge end, a glue applicator nozzle near the discharge end of the bed, means intermediate the ends of the bed for continuously feeding a web across the nozzle, a melting pot for glue located near the head end of the bed, and including means for heating the pot and the glue therein, an elongate rigid glue supply pipe extending substantially from one end of the bed to the other, and connecting the melting pot with the applicator nozzle for supplying glue to the latter, means for intermittently heating the glue supply pipe, and means mounting the melting pot upon the bed for shifting movement resulting from lengthwise expansion and contraction of the glue supply pipe connected to said melting pot, incident to temperature variations in said supply pipe.

6. Apparatus as set fourth in claim 5, wherein the combination includes means for maintaining pressure in excess of atmospheric within the melting pot and the supply pipe, for moving the glue toward the applicator nozzle, and a pump intermediate the supply pipe and said nozzle, for driving the glue through the nozzle and onto the moving web.

7. Apparatus for applying a stripe of hot-melt fluid glue to a moving web, comprising in combination, an elongate machine bed having a head end and a discharge end, a glue applicator including a nozzle mounted upon the bed near the discharge end thereof, means intermediate the ends of the bed for continuously feeding a web across the nozzle and toward said discharge end, a melting pot for glue located near the head end of the bed, and including means for heating the pot and the glue therein, a glue supply pipe connected to the pot and extending toward the discharge end of the bed lengthwise thereof, and including a connection for supplying glue to the applicator and its nozzle, pressure means for driving the glue from the pot into the supply pipe, means for intermittently heating the glue supply pipe and the applicator, means mounting the melting pot upon the bed for shifting movement to compensate for lengthwise expansion and contraction of the glue supply pipe incident to temperature variations therein, and a pump subject to heat applied to the applicator, for driving the glue through the nozzle and onto the moving web.

8. Apparatus as set forth in claim 7, wherein the combination includes means for actuating the pump independently of the web feeding means.

9. Apparatus for applying stripes of hot-melt fluid glue to moving webs, comprising in combination, an elongate machine bed having a head end and a discharge end, an elongate table forming part of the bed, a series of glue applicators mounted in spaced alignment along the length of the table, said applicators each including a nozzle, groups of web rolls mounted above the table intermediate its ends, and means feeding webs from the rolls, across the nozzles, and onto the table in superposed relation, for movement of the webs toward the discharge end of the table and bed, a melting pot for glue located near the head end of the bed, and including means for heating the pot and the glue therein, a glue supply pipe in fluid communication with the pot and extending lengthwise of the bed past the applicators and toward the discharge end of the bed, connecting means for conveying glue from the supply pipe to each applicator and its associated nozzle, pressure means for driving glue from the pot into the supply pipe, means for filtering the glue in advance of entry into the applicators, means for heating the glue supply pipe and the applicators, and pump means associated with each applicator, subject to heating by the applicator heating means, for driving glue through the nozzles of the several applicators independently of one another.

10. Apparatus as set forth in claim 9, wherein the combination includes means for actuating the pump means independently of the web feeding means.

11. Apparatus as set forth in claim 9, wherein the combination includes means shiftably mounting the melting pot upon the bed to compensate for lengthwise expansion and contraction of the glue supply pipe incident to temperature variations therein.

12. Apparatus for applying stripes of hot-melt fluid glue to moving webs, comprising in combination, an elongate machine bed having a head end and a discharge end, an elongate table forming part of the bed, a series of glue applicators mounted in spaced alignment along the table lengthwise thereof, said applicators each including a nozzle, groups of web-rolls mounted above the table intermediate its ends, and means feeding webs from the rolls, across the nozzles, and onto the table in superposed relation, for movement of the webs toward the discharge end of the table and bed, a melting pot for glue located near the head end of the bed and including means for heating the pot and the glue therein, a glue supply pipe in fluid communication with the pot and extending lengthwise of the bed in proximity to all the applicators, connecting means for conveying glue from the supply pipe to each applicator and its associated nozzle, means for heating the glue supply pipe and all the applicators, and individual and independently operated pump means associated with each applicator, subject to heating by the applicator heating means, for driving glue through the nozzles of the several applicators independently of one another.

13. Apparatus as set forth in claim 12, wherein the melting pot includes means for filtering the glue in advance of entry into the heated supply pipe.

14. Apparatus for applying stripes of hot-melt fluid glue to moving webs, comprising in combination, an elongate machine bed including a table, a glue applicator having a multi-chambered housing mounted alongside the table, and a nozzle member on the housing including a plurality of glue-emitting orifices, a web roll mounted upon the bed, and means for feeding a web from the roll onto the table and across the nozzle member orifices in position to receive glue from said orifices, means for delivering hot-melt glue to the housing chambers, an independently manually controlled pump associated with each chamber, and means placing each pump in fluid communication with a separate nozzle member orifice whereby glue from a given pump is delivered to a specific nozzle member orifice under pressure, and means for controlling operation of the pumps individually.

15. Apparatus as set forth in claim 14, wherein the combination includes means for maintaining the glue applicator housing at an elevated temperature assuring a high degree of fluidity of the glue at the pumps.

16. Apparatus for applying stripes of fluid glue to moving webs, comprising in combination, an elongate machine bed including a table, a glue applicator including a housing mounted alongside the table, a nozzle member on the housing including a plurality of glue-emitting orifices, said housing having passageways therein transmitting glue independently to each orifice, a web roll mounted upon the bed, and means for advancing a web from the roll onto the table and across the orifices of the nozzle member in position to receive glue from said orifices, pressure means including a plurality of variable speed pumps, one associated with each orifice-feeding passageway, a reservoir containing the fluid glue, and means for maintaining pressure upon the glue within the reservoir, to drive the pressurized glue into said pumps, and means for individually controlling operation of the pumps to control emission of glue at the orifices selectively.

17. Apparatus as set forth in claim 16, wherein electrical heater means thermostatically controlled, maintains the housing of the applicator at an elevated temperature assuring a high degree of fluidity of the glue therein.

18. A glue applicator comprising in combination, a housing, a nozzle member on the housing having a plurality of glue-emitting orifices, said housing having passageways therein transmitting glue independently to each orifice, pressure means including a plurality of pumps, one associated with each orifice-feeding passageway, and means for individually controlling the speed of operation of the pumps to control emission of glue at the orifices selectively.

19. A device as set forth in claim 18, wherein electrical heater means thermostatically controlled, maintains the housing of the applicator at an elevated temperature assuring a high degree of fluidity of the glue therein.

20. A glue applicator comprising in combination, a multi-chambered housing, a nozzle member on the housing having a plurality of glue-emitting orifices, said housing provided with a plurality of passageways one associated with each orifice to transmit glue to the orifices individually, said passageways having fluid communication one each with a housing chamber, means for transmitting fluid glue to the housing chambers, a pump associated with each chamber for driving fluid glue to the orifices through the individual passageways, said pumps having variable speeds and means for controlling operation of the pumps individually, whereby to selectively control emission of glue from the individual orifices.

21. A glue applicator comprising in combination, a multi-chambered housing, a nozzle member on the housing having a plurality of glue-emitting orifices, said housing provided with a plurality of passageways each connecting a housing chamber with one glue-emitting orifice, a rotary impeller within each chamber for driving fluid glue to the orifices through the individual passageways, thermostatically controlled electric heating means operative to heat the housing for maintaining a high degree of fluidity of the glue therein, a pair of impeller shafts each journalled in the housing for rotation, said shafts each carrying one of the impellers, a third shaft journalled for rotation in the housing and adapted to be driven continuously by motive means located remotely from the housing, and means for selectively placing the impeller shafts in driven relationship with said third shaft, and including means for altering the speeds of rotation of the impeller shafts individually.

22. A glue applicator comprising in combination, a multi-chambered housing, an extending cylindrical mandrel on the housing, a glue head having an axial bore receptive of the mandrel and upon which mandrel the glue head is rotatable for adjustment, the mandrel having formed therein a plurality of passageways each having an end in fluid communication with a chamber of the housing, and each having an opposite end terminating as a discharge port in the cylindrical face of the mandrel, said ports being spaced apart and adapted to emit glue in a common direction transverse to the mandrel axis, a plurality of nozzles on the glue head adapted for selective registry with the discharge ports of the mandrel upon rotational adjustment of the head about the mandrel, and separately drivable variable speed pump impellers disposed within the chambers of the housing, for drawing fluid glue from a source of supply and transmitting said glue to the discharge ports of the mandrel.

23. A glue applicator as set forth in claim 22, wherein the combination includes means for driving the impellers independently of one another, and at different rates of glue transmission movement.

24. A glue applicator comprising in combination, a multi-chambered housing, and means for heating the housing, an extending cylindrical mandrel on the housing, a glue head having an axial bore receptive of the mandrel and upon which mandrel the glue head is movable for adjustment, the mandrel having formed therein a plurality of separate passageways each having an end in fluid communication with a chamber of the housing, and each having an opposite end terminating as a discharge port in the cylindrical face of the mandrel, said ports being spaced apart and adapted to emit glue in a common direction transverse to the mandrel axis, a plurality of nozzles of differing characteristics on the glue head adapted for selective registry with the discharge ports of the mandrel upon movement of the head to selected positions of adjustment upon the mandrel, and a plurality of variable speed pump impellers one within each housing chamber, exposed to heating by the heating means of the housing, for drawing fluid glue from a source of supply and transmitting said glue in heated condition to the discharge ports of the mandrel.

25. A glue applicator as set forth in claim 24, wherein the combination includes means for driving the impellers independently of one another, and at different glue transmission rates.

26. A glue applicator comprising in combination, a multi-chambered housing, a mandrel extending from the housing, and a glue head including a plurality of glue-distributing nozzles of differing characteristics, said mandrel having formed therein a plurality of separate passageways each having an end in fluid communication with a chamber of the housing, and each having an opposite end terminating as a discharge port on the mandrel, said ports being spaced apart and adapted to emit glue in a common direction transversely of the mandrel, means mounting the glue head upon the mandrel for movement thereon to positions of adjustment at which selected nozzles of the head may register with the discharge ports of the mandrel, and means within the housing chambers for drawing fluid glue from a source of supply and transmitting the glue under pressure to the discharge ports of the mandrel.

27. A glue applicator comprising in combination, a glue head including a plurality of glue-distributing nozzles of differing characteristics, a mandrel having formed therein a plurality of separate passageways each terminating as a discharge port upon the mandrel, and means mounting the glue head upon the mandrel for movement to positions of adjustment at which selected nozzles may be registered with the discharge ports of the mandrel.

28. Apparatus for applying stripes of hot-melt fluid glue to moving webs, comprising in combination, an elongate machine bed having a head end and a discharge end, an elongate table forming part of the bed, a series of glue applicators mounted in spaced alignment along the table lengthwise thereof, said applicators each including a nozzle, groups of web rolls mounted upon the bed, and means feeding webs from the rolls, across the nozzles, and onto the table lengthwise thereof in the direction of the discharge end, a melting pot for glue located near the head end of the bed and including a first electric heater, a glue supply pipe in fluid communication with the pot and extending lengthwise of the bed in proximity to the applicators, connecting means for conveying glue from the supply pipe to each applicator and its associated nozzle, a second electric heater means for heating the supply pipe and the applicators, individual pump means associated with each applicator, subject to heating by the applicator heating means, for driving glue through the nozzles of the several applicators independently of one another, a source of electric current, a main electrical circuit including said heater means for the pot, the supply pipe, and the applicators, a main switch in said circuit for connecting all said heater means with the source of current to energize all said heater means, a secondary electric circuit including a switch operative manually and independently of the main switch, to energize at least one of the heater means while the main switch is open-circuited, and means responsive to an elevated temperature condition of said one heater means, for closing the main switch of the main circuit and thereby maintain all the heater means in energized condition.

29. In a glue-applying apparatus, the combination of a melting pot for glue, and a first electric heater means for heating said pot, a glue supply pipe in fluid communication with said melting pot, and a second electric heater means for heating the supply pipe, a glue applicator including a nozzle, and means connecting the nozzle in fluid communication with the supply pipe for distribution of glue by said nozzle, a third electric heater means for heating the applicator, a source of electric current, a main electrical circuit including the heater means for the pot, the supply pipe, and the applicator, a main switch in said circuit for connecting all said heater means with the source of current to effect energization of all said heater means, a secondary electric circuit including a switch operative independently of the main switch, to initiate energization of at least one of the heater means while the main switch is open-circuited, and means responsive to a predetermined temperature condition of said one heater means, for closing the main switch of the main circuit and thereby maintain all the heater means in energized condition.

30. In a glue applying apparatus, the combination of a melting pot for glue, a first electric heater means for heating said pot, a glue supply pipe in fluid communication with said melting pot, and a second electric heater means for heating the supply pipe, a glue applicator including a nozzle, and means connecting the nozzle in fluid communication with the supply pipe for distribution of glue by said nozzle, a third electric heating means for heating the applicator, a source of electric current, a main electrical circuit including said heater means for the pot, said supply pipe, and said applicator, a main switch in said circuit connecting all said heater means with the source of current to effect energization of all said heater means, and auxiliary means for pre-heating one of said heater means, including means operative to close the main switch of the main circuit when the pre-heated heater means reaches a desired heated condition.

References Cited

UNITED STATES PATENTS

| | | | |
|---|---|---|---|
| 685,566 | 10/1901 | Brown | 156—549 |
| 2,660,148 | 11/1953 | Fogg | 118—411 |
| 2,926,723 | 3/1960 | Clark | 156—546 |
| 3,033,160 | 5/1962 | Steidinger | 156—548 |
| 3,138,514 | 6/1964 | Florio | 156—291 |

HAROLD ANSHER, Primary Examiner

H. F. EPSTEIN, Assistant Examiner

U.S. Cl. X.R.

118—5, 411, 429; 156—548, 578